United States Patent [19]

Song et al.

[11] Patent Number: 5,289,588
[45] Date of Patent: Feb. 22, 1994

[54] INTERLOCK ACQUISITION FOR CRITICAL CODE SECTION EXECUTION IN A SHARED MEMORY COMMON-BUS INDIVIDUALLY CACHED MULTIPROCESSOR SYSTEM

[75] Inventors: Seungyoon P. Song; Stephen C. Horne, both of Austin, Tex.

[73] Assignee: Advanced Micro Devices, Inc., Sunnyvale, Calif.

[21] Appl. No.: 513,806

[22] Filed: Apr. 24, 1990

[51] Int. Cl.[5] .......................... G06F 13/16; G06F 13/36
[52] U.S. Cl. ....................................... 395/425; 395/725;
364/243; 364/259; 364/DIG. 1
[58] Field of Search ................... 364/DIG. 1, DIG. 2;
395/325, 725, 800, 425

[56] References Cited

U.S. PATENT DOCUMENTS

| | | | |
|---|---|---|---|
| 4,249,241 | 2/1981 | Averle et al. | 395/500 |
| 4,394,731 | 7/1983 | Flusch et al. | 395/425 |
| 4,574,350 | 3/1986 | Starr | 395/725 |
| 4,775,955 | 10/1988 | Liu | 395/425 |
| 4,901,230 | 2/1990 | Chen et al. | 395/325 |
| 4,965,717 | 10/1990 | Cutts, Jr. et al. | 395/425 |
| 5,043,886 | 8/1991 | Witek et al. | 395/425 |
| 5,050,072 | 9/1991 | Earnshaw et al. | 364/200 |
| 5,129,089 | 3/1992 | Nielsen | 395/725 |

*Primary Examiner*—Thomas C. Lee
*Assistant Examiner*—Paul R. Lintz
*Attorney, Agent, or Firm*—Foley & Lardner

[57] ABSTRACT

There is disclosed an interlock variable acquisition system and method for use in a processing system of the type including a plurality of processors coupled by a common bus which permits exclusive execution of critical sections by each of the processors while limiting traffic on the common bus. A cache associated with each of the processors stores the value of the interlock variable and locally tests the interlock variable state responsive to an instruction from its processor. If the cache determines that the interlock variable is in the available state, it conveys the available value of the interlock variable to its associated processor and writes, over the common bus, the busy state to each cache associated with the other processors. When its processor completes its critical section, the cache writes, over the common bus, the available state of the interlock variable to each cache associated with the other processors. The other caches update their copies of the interlock variable and do not invalidate them.

32 Claims, 2 Drawing Sheets

INTERLOCK ACQUISITION FOR CRITICAL CODE SECTION EXECUTION IN A SHARED MEMORY COMMON-BUS INDIVIDUALLY CACHED MULTIPROCESSOR SYSTEM

BACKGROUND OF THE INVENTION

The present invention relates to an interlock variable acquisition system and method for permitting exclusive access to a shared resource by each of a plurality of processors over a common bus and which limits traffic on the common bus associated with the provision of such exclusive access.

Processing systems may include a plurality of processors which require access to a shared memory over a common bus in order to execute instructions in accordance with their respective programs. Such processors can be called upon to execute related program portions wherein the related program portions require that they be executed individually and not simultaneously with the execution of any other of the related program portions. Such related program portions are known as critical sections. Critical sections are required to provide a processor exclusive access to a shared resource, such as a shared memory and to thus assure that only one processor is executing a critical section at any one time.

Hence, in a shared memory multiprocessor system, provision must be made to allow a processor to have exclusive access to some shared resource during the time in which it is executing a critical section. When a processor is executing a critical section, no other processor can be in a related critical section. A critical section must be guarded so that only one processor can be in a critical section at any one time. The guard may be a code segment that precedes a critical section and which has the function to prevent more than one processor from executing a critical section.

One prior art method for implementing the guard into a critical section uses interlock variables. An interlock variable may have one of two values, an available value indicating that no processor is executing a critical section, and a busy value indicating that a processor is executing a critical section. In accordance with this method, the shared memory includes a memory location for storing the value of the interlock variable and each processor includes a register. When a processor wishes to enter a critical section, it reads the interlock variable within the memory location of the shared memory and loads that value of the interlock variable into its register. The processor also writes back to the interlock variable memory location of the shared memory the busy value of the interlock variable. The reading and writing of the interlock variable are performed atomically so that no other processor can access the common bus between the read and the write. If, following the read and the write, the register of the processor contains a busy value, the processor will not enter its critical section but instead perform the read and write operation again. However, if the register of the processor contains the available value of the interlock variable, the processor will enter its critical section.

The foregoing forms a loop in which the interlock variable in the interlock variable memory location of the shared memory is being tested. Such a loop is a type of guard known as a spin-lock. A busy value of the interlock variable indicates to the testing processor that another processor "owns" the interlock variable and is in a critical section. An available value of the interlock variable indicates that no processor is in its critical section. This processor acquires the interlock variable by writing the busy value into the interlock variable to communicate to all the processors that it is in its critical section. The processor then enters its critical section and no other processor wishing to enter a critical section will be able to do so until the processor in its critical section has completed its critical section.

When an owning processor completes execution of its critical section, it then communicates this fact to the other processors by writing the available value to the interlock variable in the shared memory. The next processor wishing to enter a critical section will then test the available value of the interlock variable and perform the same operations to enter its critical section. Ownership transfer of the interlock variable thus occurs when one processor writes the available value into the interlock variable and another processor subsequently acquires it in the manner described above.

While this method simplifies the implementation of assuring exclusive access to a critical section, the common bus becomes a performance bottleneck. This results because a processor wishing to acquire the interlock variable and enter a critical section must continually utilize the common bus to test the value of the interlock variable in the shared memory.

Another and still more efficient method of providing exclusive access to a critical section by a processor employs a cache associated with each of the processors for storing, locally to each processor, the most recent value of the interlock variable. Such caches can allow the value of the interlock variable to be modified relative to the shared memory. When the cache of another processor attempts to read the value of the interlock variable from the shared memory, the cache with the most recently modified value of the interlock variable intervenes and supplies the value of the interlock variable instead of the shared memory. In this way, all of the caches see the same correct value of the interlock variable even though the caches may be more up-to-date than the shared memory.

In such a system, when a processor desires to enter a critical section, its cache fetches the value of the interlock variable from either memory or the cache having the most recently updated value of the interlock variable, stores it, and then sends that value to its associated processor. If the interlock variable has a busy value, the cache does not follow the read with a write. Subsequent testing of the value of the interlock variable by this processor is performed locally in its cache, and, as a result, the shared bus is not accessed for this purpose. All processors wishing to enter a critical section obtain the busy value of the interlock variable in its associated cache and go into a loop, with each processor testing its local copy.

Eventually, the owning processor releases the interlock variable by executing a write instruction for writing the available value of the interlock variable on the shared bus while a "LOCK pin" is asserted. Each cache with a copy of the interlock variable invalidates its copy upon seeing the locked write. The next time such a processor wishes to enter a critical section, its cache will obtain, over the common bus, the available value of the interlock variable from either the shared memory or a cache, will become the owner of the interlock variable, and locally set the value of the interlock variable in its cache to the busy value. Thus, processors that subsequently read the interlock variable will read a busy value.

Hence, in accordance with the above-described prior art method, the common bus is used more efficiently by allowing each processor to cache the value of the interlock variable locally within its cache and to locally test the value of the interlock variable without using the common bus except for initially loading the interlock variable into its cache. Considerable common bus traffic still occurs, however, after a processor completes a critical section and writes the available value to the interlock variable. This is because all processors invalidate their copies of the value of the interlock variable when the owning processor releases the interlock. Each processor must then in turn obtain the new value of the interlock variable by the common bus, making the common bus a bottleneck in the process. With this method, the number of common bus accesses each time ownership transfer of the interlock occurs is proportional to the number of processors waiting to enter a critical section. This level of common bus activity is still too high for processing systems having a large number of processors. Hence, there is a need in the art for an improved interlock variable acquisition system and method to permit exclusive access to critical sections by each of a plurality of processors which further limits the traffic on a common bus associated with the provision of such exclusive access.

SUMMARY OF THE INVENTION

The invention therefore provides an interlock variable acquisition system for use in a processing system of the type including a plurality of processors coupled to a common bus and wherein the processors are arranged to execute program instructions including critical sections requiring exclusive execution thereof. The interlock variable acquisition system is arranged to permit exclusive execution of critical sections by each of the processors while limiting traffic on the common bus. The interlock variable acquisition system includes storage means associated with each of the processors for storing an interlock variable having either an available value indicating that no other processor is currently executing a critical section or a busy value indicating that another processor is currently executing a critical section and interlock variable detect means associated with each of the processors and responsive to a command instruction from its associated processor for detecting the value of the interlock variable in its associated storage means. The system further includes write means associated with each of the processors and responsive to its associated interlock variable detect means detecting the available value of the interlock variable in its associated storage means for conveying the available value of the interlock variable to its associated processor and writing, over the common bus, the busy value of the interlock variable to the other storage means storing the interlock variable for updating the value of the interlock variable stored in the other storage means to the busy value.

The invention further provides a method for use in a processing system of the type including a plurality of processors coupled to a common bus wherein the processors are arranged to execute program instructions including critical sections requiring exclusive execution thereof, the method for permitting exclusive execution of critical sections by each of the processors while limiting traffic on the common bus. The method includes the steps of providing a storage means associated with each processor, storing within each storage means an interlock variable having either an available value indicating that no other processor is currently executing a critical section or a busy value indicating that another processor is currently executing a critical section and detecting the value of the interlock variable in one of the storage means responsive to a command instruction from one of the processors. The method includes the further step of conveying the available value of the interlock variable to the processor issuing the command instruction and writing, over the common bus, the busy value of the interlock variable to the other storage means storing the interlock variable and associated with each processor other than the processor issuing the command instruction for updating the value of the interlock variable stored in the other storage means to the busy value in response to detecting the available value of the interlock variable in the storage means associated with the processor issuing the access instruction.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals identify identical elements, and wherein:

DETAILED DESCRIPTION OF THE PREFERRED EMBODIMENT

Figure 1:
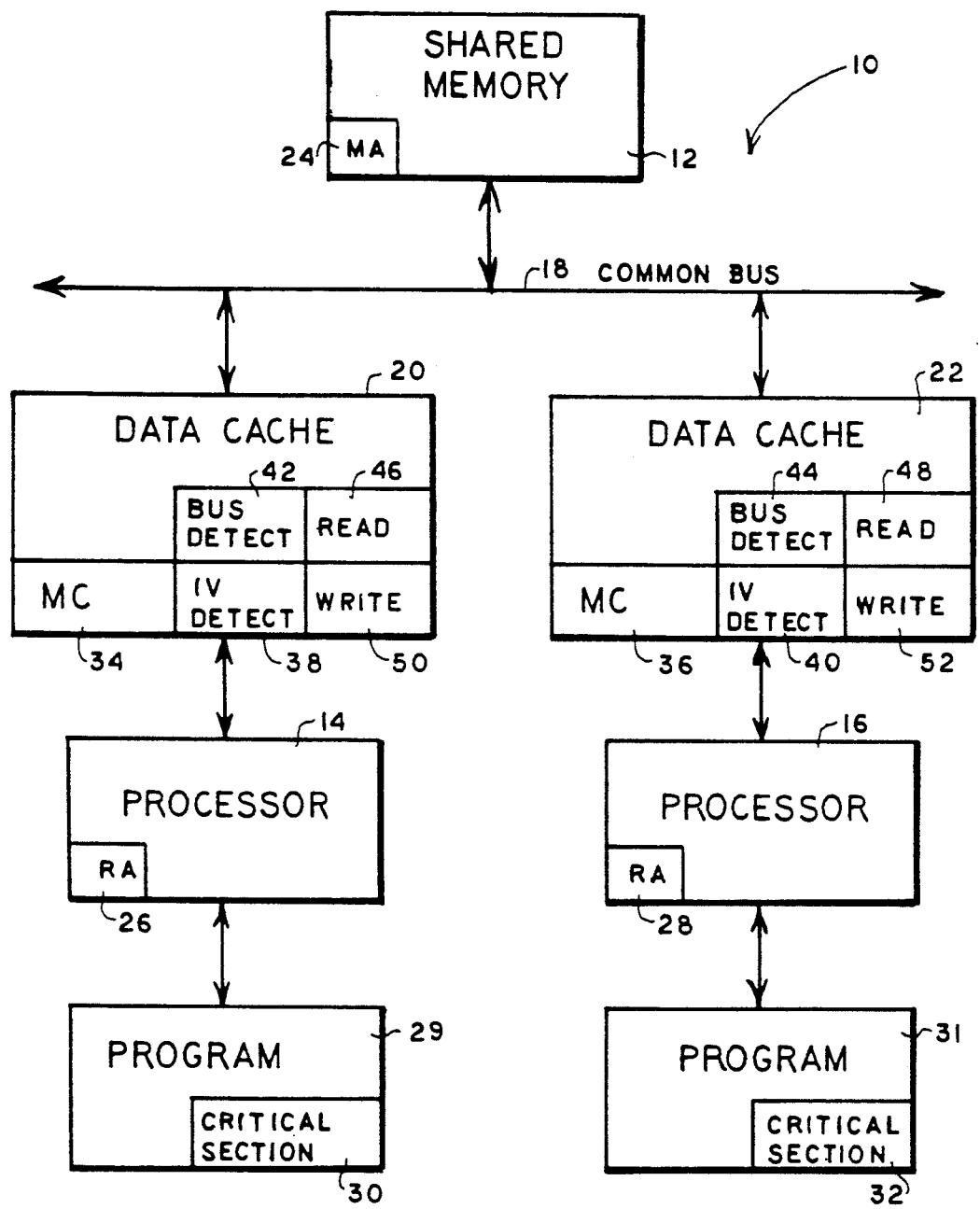
FIG. 1 is a block diagram of a shared memory multiprocessor system embodying the present invention.

Referring now to FIG. 1, it illustrates, in block diagram form, a shared memory multiprocessor system 10 embodying the interlock variable acquisition system and method of the present invention. The system 10 generally includes a shared memory 12, a plurality of processors 14 and 16, and a common bus 18. Associated with each of the processors 14 and 16 is a data cache 20 and 22 respectively. As will be appreciated hereinafter, the system 10 may incorporate additional processors and associated data caches for implementing the present invention to advantage and that a pair of processors and associated data caches are illustrated for purposes of describing the preferred embodiment of the present invention.

The shared memory 12 includes a memory portion 24 for storing the value of an interlock variable (MA) to indicate whether a processor is or is not currently in a critical section. As will be seen hereinafter, the value of the interlock variable stored in memory portion 24 may not be the most current value and, indeed, in accordance with this preferred embodiment the memory portion 24 need not be provided in practicing the present invention. It is included herein, however, for completeness since in some implementations of the present invention, the provision of memory portion 24 may be desirable.

The interlock variable MA may have either an available value indicating that no processor is in a critical section or a busy value indicating that a processor is in a critical section. For purposes of this preferred embodiment, the busy value is less than zero, and preferably, minus one (−1) and the available value is equal to or greater than zero, and preferably, zero (0).

The shared memory 12 is coupled to the common bus 18 which is in turn coupled to each of the processors 14 and 16 through their respective data caches 20 and 22 respectively. Each of the processors 14 and 16 include a register 26 and 28. The registers 26 and 28 are provided for storing a value of the interlock variable received from the respective caches 20 and 22.

Associated with each of the processors 14 and 16 is a program 29 and 31 respectively which provide the processors with execution instructions. Each of the programs include a critical section 30 and 32 respectively. For purposes of this preferred embodiment, the critical sections 30 and 32 are related program portions which should not be executed by processors 14 and 16 simultaneously. If a processor sees that the value of the interlock variable stored in its register is the available value, it will enter its critical section. However, if the value of the interlock variable stored in a register is the busy value, the respective processor will not enter its critical section.

Each of the caches 20 and 22 includes a storage mean 34 and 36 respectively for storing the value of the interlock variable. The caches 20 and 22 further include interlock variable detect means 38 and 40 respectively which are provided for detecting the value of the interlock variable stored in the storage means 34 and 36 respectively. The caches 20 and 2 further include bus detect means 42 and 44 respectively for detecting whether the common bus 18 is available, read means 46 and 48 respectively for reading the most recent value of the interlock variable from the common bus 18 and write means 50 and 52.

In accordance with techniques well known in the art, to maintain data cache coherency, when a cache must obtain the most recent value of the interlock variable, it will perform a read operation on the bus 18. If there is a copy of the interlock variable in a cache that is more up to date than memory (i.e., modified) then the variable will be supplied by a cache instead of memory.

Each of the write means 50 and 52 is arranged to perform a broadcast write operation for conveying an interlock variable value to each of the other storage means associated with the other caches storing the interlock variable. This write operation is performed when the interlock variable is shared and updates all other caches storing the interlock value with a new value.

Figure 2:
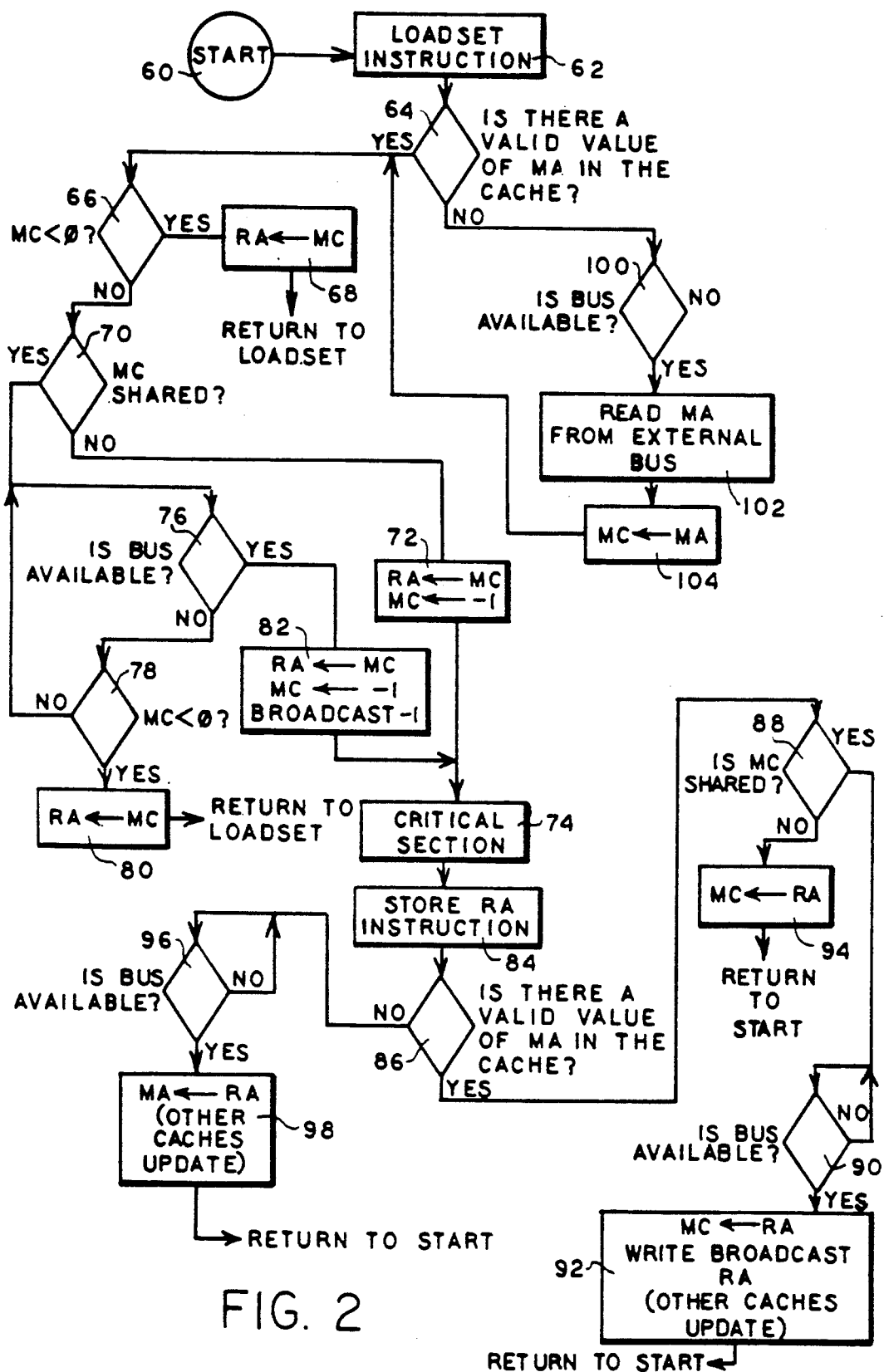
FIG. 2 is a flow diagram illustrating the manner in which the shared memory multiprocessor system of FIG. 1 may be implemented in accordance with the present invention.

The operation of the system 10 may best be understood by making reference to the flow diagram of FIG. 2. The interlock variable acquisition system and method begins at START in step 60 with each cache waiting to receive a LOADSET or command instruction from its associated processor. When one of the processors wishes to enter a critical section, it issues a command instruction illustrated in FIG. 2 in accordance with step 62 as a LOADSET instruction. For purposes of this description, it will be assumed that the LOADSET instruction has been issued by processor 14.

The LOADSET instruction issued by processor 14 in step 62 is received by the cache 20 which then determines in step 64 if the value of the interlock variable stored in its storage means 34 is valid. The cache 20 makes this determination in response to a status bit in its storage means 34 which is stored with the interlock variable. Status bits and the use thereof are well known in the art and the manner in which the status bit is utilized by the cache 20 may be performed in conformity to conventional status bit usage in the art. If the value of the interlock variable stored in storage means 34 is valid, the cache 20 through the interlock variable detector 38 determines if the value of the interlock variable stored in the storage means 34 is less than zero in accordance with step 66.

If the value of the interlock variable stored in storage means 34 is less than zero, this will indicate a busy value of the interlock variable and that another processor is in the process of executing a critical section. As a result, in step 68, the cache 20 conveys the busy value of the interlock variable stored in the storage means 34 to the register 26 of processor 14. Thereafter, the system returns to await the receipt of another LOADSET instruction.

If in step 66 the cache 20 determines that the value of the interlock variable stored in the storage means 34 is not less than zero, the cache 20 will then, in accordance with step 70, determine if the value of the interlock variable stored in storage means 34 is shared by the storage means associated with any of the other processors in the system, and, in accordance with this preferred embodiment, storage means 36 associated with processor 16. The cache 20 makes this determination by additional bits stored in association with the interlock variable. If these bits indicate that the interlock variable is stored in other caches, and thus is shared, the cache 20 will know that it must perform a write broadcast to the other caches to update their values of the interlock variable should cache 20 and processor 14 become the owner of the interlock variable. If the value is not shared, cache 20 will then in step 72 convey the contents of storage means 34 to the register 26 and a value of minus one (−1) to its storage means 34. Thereafter, the processor 14 begins to execute its critical section in step 74.

If it is determined in step 70 that the value of the interlock variable stored in storage means 34 is shared, the cache 20 will then in step 76, through the bus detect means 42, determine if the common bus 18 is available. If the bus is not available, cache 20 will then, in step 78, through the interlock variable detect means 38, determine if the value of the interlock variable has changed to be less than zero since determining, in step 66, that the value of the interlock variable was not less than zero. In other words, if the bus is not available, the cache 20 determines if another processor has acquired the available value of the interlock variable since it last determined that the value of interlock variable was the available value.

If the value of the interlock variable has changed to be less than zero, and thus to the busy value, the cache 20 then conveys in step 80, the busy value of the interlock variable stored in the storage means 34 to the register 26 of processor 14. The processor 14 will then not enter its critical section and the system will return to receive another LOADSET instruction from processor 14.

If in step 78 the interlock variable detect means 38 determines that the value of the interlock variable is not less than zero, and thus, is still available, the cache 20 will then return to step 76 to permit the bus detect means 42 to once again determine if the bus is available. As can thus be seen, if the bus is not available, the cache 20 will continue to determine if the value of the interlock variable has changed. If the value has changed to the busy value, it conveys that value to its processor so that the processor does not enter its critical section and then returns. If the value of the interlock variable has not changed, the cache returns to once again determine if the bus is available.

If the cache 20 determines that the bus is available in step 76, the cache then in step 82, through write means 50, conveys the available value of the interlock variable stored within storage means 34 to the register 26 of processor 14 and writes the busy value of the interlock variable into its own storage means 34. Also, in step 82, the cache 20 through the write means 50 broadcast writes the busy value of minus one (−1) to the storage means associated with the other processors which are storing the interlock variable, in this case, storage means 36 associated with processor 16. In this manner, the cache 20 updates the shared value of the interlock variable in all caches which are storing the interlock variable. Also, while the cache 20 performs the broadcast write of the busy value, it can also optionally write the busy value into the memory portion 24 of the shared memory 12.

After step 82, or after step 72, processor 14 enters its critical section in accordance with step 74. After completing its critical section, the processor 14, in step 84, issues a critical section complete instruction referred to herein as a STORE RA instruction. This causes the cache 20 in step 86 to determine if it has a valid value of the interlock variable in its storage means 34. If it does, it then in step 88 once again determines if the interlock variable is shared. If it is, the cache 20 then proceeds to step 90 to determine if the bus is available. If the bus 18 is not available, it continues to detect the availability of the bus 18. When the bus 18 becomes available, the cache 20, through the write means 50, in step 92, writes the available value of the interlock variable stored in register 26 of processor 14 into its storage means 34 and write broadcasts the available value of the interlock variable stored in register 26 to each of the other storage means which are storing the interlock variable for updating their copies. The write operation performed in step 92 is performed over the common bus 18 and optionally may also update the memory portion 24 of shared memory 12. After completing step 92, the system returns to START.

If in step 88 it is determined that the interlock variable is not shared, the cache 20 proceeds to step 94. In step 94, the cache 20, through write means 50, merely writes the value of the interlock variable stored in register 26 to its storage means 34. It then returns to START.

If in step 86 it is determined that the storage means 34 does not have a valid value of the interlock variable, the cache 20 then in step 96 determines, through the bus detect means 42, if the bus 18 is available. If it is not, the bus detect means continues to detect for the availability of the bus 18. When the bus 18 becomes available, the cache 20, through write means 50, writes, in step 98, the value of the interlock variable stored in register 26 to the memory portion 24 of shared memory 12 and broadcast writes that same value to all other caches storing the interlock variable for updating their copies to the available state. The cache 20 then returns to START.

If in step 64, it is determined that the storage means 34 of cache 20 does not have a valid value of the interlock variable, the cache 20 proceeds to step 100 to determine, through the bus detect means 42, if the common bus 18 is available. If the common bus is not available, the bus detect means 42 continues to check for the availability of the common bus. If the common bus 18 is available, the cache 20, through read means 46 then in step 102 reads the most recent value of the interlock variable from the bus (from either memory or the cache having the most recent value of the interlock variable). The cache 20 then proceeds to step 104 and conveys the value of the interlock variable obtained from the bus 18 to its storage means 34. After step 104, the cache 20 then proceeds to step 66, and proceeds as previously described.

In summary, therefore, when a processor releases an interlock by broadcasting the available value of the interlock variable to all other caches storing the interlock variable, all other caches are updated with the new value of the interlock variable. After a processor releases an interlock, all caches that have their own local copy will read an available value of the interlock variable. To guarantee that only one processor actually acquires the interlock variable, if a cache finds an available value that is also shared by other caches, the available value is not conveyed to the processor until the cache obtains access to the shared bus. While waiting for the bus, the cache continues to check the value of the local copy of the interlock variable. This is performed because another processor may get access to the common bus first and perform its write operation to change the value of the interlock variable in all caches. If a cache accesses the bus and has determined that the interlock variable is still in the available state, the cache returns the available value to its processor and performs the write operation to write broadcast the busy value to all other caches. If, on the other hand, a cache has found an available value locally and is waiting for the bus when it determines that the value of the interlock variable has been set to the busy state by another cache, it terminates requesting the bus, and returns the busy value to its processor. If a cache determines locally that the value of the interlock variable is in the busy state, no further action is required other than to abort its write operation. The busy value detected is simply returned to its processor.

Using this system and method for acquiring interlock variables by caching the interlock variables, bus accesses are made only to initially load the interlock variable, and if it is shared, to acquire the interlock variable and to release it. This greatly reduces common bus traffic in a shared bus multiprocessor system associated with acquiring interlock variables and providing exclusive access to critical sections by a plurality of processors.

In addition, shared memory accesses are not required which is advantageous since cache accesses do not require the bus and may be made in roughly one-tenth the time. Also, reading an interlock variable from another cache requires less time than reading the same from shared memory.

While a particular embodiment of the present invention has been shown and described, modifications may be made, and it is therefore intended to cover in the appended claims all such changes and modifications which fall within the true spirit and scope of the invention.

What is claimed is:

1. An interlock variable acquisition system for use in a processing system of the type including a plurality of processors coupled to a common bus, selected processors of said plurality of processors having a data cache and being arranged to execute program instructions including at least one particular critical section requiring exclusive execution thereof, said interlock variable acquisition system being arranged to permit exclusive execution of said at least one particular critical section by each of said selected processors while limiting traffic on said common bus and comprising:

- storage means associated with said data cache of each one of said selected processors for storing an interlock variable related to said at least one particular critical section executable by said one selected processor, said interlock variable having either an available value indicating that no processor of said plurality of processors other than said one selected processor is currently executing said at least one particular critical section or a busy value indicating that another processor of said plurality of processors other than said one selected processor is currently executing said at least one particular critical section, said storage means being arranged to store a plurality of status bits associated with said interlock variable, said plurality of status bits including a first status bit having a first value when said interlock variable has a valid value and a second status bit having a second value when said interlock variable is shared by said other said storage means storing said interlock variable, said storage means being arranged to provide said common bus with the value of said interlock variable stored therein responsive to said first status bit having said first value;
- interlock variable detect means associated with said data cache of each one of said selected processors and responsive to a command instruction from its associated said one selected processor for detecting the value of said interlock variable in its associated storage means; and
- write means associated with said data cache of each one of said selected processors and responsive to its associated interlock variable detect means detecting said available value of said interlock variable in its associated storage means for conveying said available value of said interlock variable to its associated said one selected processor and writing, over said common bus, said busy value of said interlock variable to said storage means associated with processors of said plurality of processors other than said one selected processor, for updating the value of said interlock variable stored in said other storage means to said busy value.

2. A system as defined in claim 1 further comprising bus detecting means associated with each of said selected processors for detecting means associated with each of said selected processors for detecting the availability of said common bus responsive to its associated interlock variable detect means detecting said available value of said interlock variable in its associated storage means and responsive to said interlock variable being shared.

3. A system as defined in claim 2 wherein said write means are responsive to its associated bus detecting means detecting that said common bus is available.

4. A system as defined in claim 2 wherein said interlock variable detect means are arranged for detecting a change in the value of said interlock variable to said busy value while its associated bus detect means detects for the availability of said common bus.

5. A system as defined in claim 4 wherein said bus detecting means are arranged to terminate detecting the availability of said bus responsive to its associated interlock variable detect means detecting said busy value in its associated storage means prior to said bus detecting means detecting that said common bus is available.

6. A system as defined in claim 5 wherein said write means are arranged to convey said busy value to its associated selected processor responsive to said interlock variable detect means detecting said busy value in its associated storage means prior to its associated bus detecting means detecting that said common bus is available.

7. A system as defined in claim 1 wherein said write means are also arranged to write said busy value into its associated storage means when said write means conveys said available value to its associated selected processor.

8. A system as defined in claim 1 wherein said write means are responsive to a critical section complete instruction from its associated processor for writing said available value from its associated selected processor to its associated storage means and writing, over said common bus, said available value of said interlock variable from its associated selected processor to each said other storage means storing said interlock variable for updating the value of said interlock variable stored in said other storage means to said available value.

9. A system as defined in claim 1 wherein said interlock variable detect means are arranged to determine if its associated storage means contains a valid value of said interlock variable.

10. A system as defined in claim 9 further comprising bus detecting means associated with each of said selected processors for detecting the availability of said common bus responsive to its associated interlock variable detect means detecting that its associated storage means does not contain a valid value of said interlock variable.

11. A system as defined in claim 10 further comprising a read means associated with each said selected processor for reading information from said common bus, each said read means being coupled with its associated interlock variable detect means, with its associated bus detecting means, and with its associated write means, said read means being arranged to read the valid value of said interlock variable from said common bus when its associated bus detecting means detects that said common bus is available.

12. A system as defined in claim 11 further including a memory coupled to common bus and wherein each said storage means is arranged to provide said common bus with the value of said interlock variable stored therein if its value is a valid value and its value is more up to date than the value in said memory.

13. A system as defined in claim 11 wherein said write means are arranged to convey the valid value of said interlock variable to its associated storage means from its associated read means.

14. A system as defined in claim 13 wherein said interlock variable detect means are arranged to detect the value of said interlock variable in its associated storage means after said write means conveys the valid value of said interlock variable to its associated storage means.

15. A system as defined in claim 14 wherein said write means are responsive to said available value being detected by its associated interlock variable detect means for conveying said available value to its associated selected processor, said busy value to its associated storage means, and writing, over said common bus, said busy value to said other storage means storing said interlock variable for updating said other storage means to said busy value.

16. A system as defined in claim 15 wherein said write means are responsive to a critical section complete instruction from its associated selected processor for conveying said available value from its associated selected processor to its associated storage means and writing, over said common bus, said available value of said interlock variable from its associated selected processor to said other storage means storing said interlock variable.

17. A method for use in a processing system of the type including a plurality of processors coupled to a common bus, selected processors of said plurality of processors having a data cache and being arranged to execute program instructions including at least one particular critical section requiring exclusive execution thereof, said method for permitting exclusive execution of said at least one particular critical section by each of said selected processors while limiting traffic on said common bus and comprising:
providing a storage means associated with said data cache of each one of said selected processors;
storing within said storage means an interlock variable related to said at least one particular critical section executable by said one selected processor, said interlock variable having either an available value indicating that no processor of said plurality of processor other than said one selected processor is currently executing said at least one particular critical section or a busy value indicating that another processor of said plurality of processors other than said one selected processor is currently executing said at least one particular critical section;
storing within said storage means a plurality of status bits associated with said interlock variable, said plurality of status bits including a first status bit having a first value when said interlock variable has a valid value and a second status bit having a second value when said interlock variable is shared by said other said storage means storing said interlock variable, said storage means being arranged to provide said common bus with the value of said interlock variable stored therein responsive to said first status bit having said first value;
detecting the value of said interlock variable in one of said storage means responsive to a command instruction from one of said selected processors; and
conveying said available value of said interlock variable to said one selected processor and writing, over said common bus, said busy value of said interlock variable to said storage means associated with processors of said plurality of processors other than said selected processor issuing said command instruction, for updating the value of said interlock variable stored in said other storage means to said busy value in response to detecting said available value of said interlock variable in said storage means associated with said selected processor issuing said command instruction.

18. A method as defined in claim 17 comprising the further steps of detecting whether said interlock variable is shared by said other storage means and detecting the availability of said common bus after detecting said available value of said interlock variable in said storage means associated with said selected processor issuing said command instruction.

19. A method as defined in claim 18 comprising the further step of repeatedly detecting the value of said interlock variable while detecting the available of said common bus.

20. A method as defined in claim 19 comprising the further step of terminating the detecting of the availability of said common bus upon detecting that said value of said interlock value stored in said storage means associated with said selected processor issuing said command signal has changed to said busy value prior to detecting that said common bus is available.

21. A method as defined in claim 20 comprising the further step of conveying said busy value to said selected processor issuing said command instruction responsive to detecting that said value of said interlock variable stored in said storage means associated with said selected processor issuing said command instruction has changed to said busy value prior to detecting that said common bus is available.

22. A method as defined in claim 17 comprising the further step of writing said busy value of said interlock variable into said storage means associated with said selected processor issuing said command instruction when conveying said available value of said interlock variable to said selected processor issuing said command instruction.

23. A method as defined in claim 17 comprising the further steps of writing from said selected processor issuing said command instruction said available value of said interlock variable to its associated storage means and, over said common bus, to each said other storage means storing said interlock variable for updating the value of said interlock variable to said available value responsive to said selected processor issuing said command instruction issuing a critical section complete instruction.

24. A method as defined in claim 17 comprising the further step of determining if the storage means associated with said selected processor issuing said command instruction contains a valid value of said interlock variable.

25. A method as define in claim 24 comprising the further step of detecting whether said common bus is available when said storage means associated with said selected processor issuing said command instruction does not contain a valid value of said interlock variable.

26. A system as defined in claim 25 further comprising the step of reading a valid value of said interlock variable from said common bus when said common bus is available.

27. A method as defined in claim 26 comprising the further step of writing the valid value of said interlock variable read from said common bus to said storage means associated with said selected processor issuing said command instruction.

28. A method as defined in claim 27 comprising the further step of detecting the value of said interlock variable contained within said storage means associated with said selected processor issuing said command instruction after writing said valid value read from said common bus to said associated storage means.

29. A method as defined in claim 28 comprising the further step of writing, over said common bus, said busy value to said other storage means storing said interlock variable and associated with each said selected processor other than said selected processor issuing said command instruction and writing said busy value into said storage means associated with said selected processor issuing said command instruction after detecting said available value of said interlock variable within said storage means associated with said selected processor issuing said command instruction.

30. A method as defined in claim 29 comprising the further step of conveying said available value to said selected processor issuing said command instruction from its associated storage means.

31. A method as defined in claim 30 comprising the further step of writing, over said common bus, said available value of said interlock variable from said selected processor issuing said command instruction to each said other storage means storing said interlock variable for updating the value of said interlock variable stored therein to said available value responsive to said selected processor issuing said command instruction issuing a critical section complete instruction.

32. A method as defined in claim 31 comprising the further step of conveying said available value from said selected processor issuing said critical section complete instruction to its associated storage means.

* * * * *